United States Patent
Lioy et al.

(10) Patent No.: US 8,170,027 B2
(45) Date of Patent: May 1, 2012

(54) APPARATUS AND METHOD FOR SUPPORTING HIGHER DATA RATES ON LINKS WITH VARIABLE FRAME SIZES

(75) Inventors: Marcello Lioy, San Diego, CA (US); Vanitha Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 12/471,851

(22) Filed: May 26, 2009

(65) Prior Publication Data

US 2010/0303074 A1 Dec. 2, 2010

(51) Int. Cl.
*H04L 12/56* (2006.01)
(52) U.S. Cl. ....................................... 370/392
(58) Field of Classification Search .................. 370/392, 370/468, 329, 335, 342, 358, 391
See application file for complete search history.

(56) References Cited

U.S. PATENT DOCUMENTS

| | | | | |
|---|---|---|---|---|
| 6,157,649 A * | 12/2000 | Peirce et al. | .................. | 370/401 |
| 7,009,999 B2 * | 3/2006 | Dickson | ........................ | 370/468 |
| 2006/0153232 A1 | 7/2006 | Shvodian | | |
| 2007/0230507 A1 * | 10/2007 | Lingafelt et al. | .............. | 370/473 |
| 2009/0059853 A1 | 3/2009 | Kim et al. | | |

OTHER PUBLICATIONS

International Search Report and Written Opinion—PCT/US2010/036205, International Search Authority—European Patent Office—Dec. 22, 2010.

* cited by examiner

*Primary Examiner* — Man Phan
*Assistant Examiner* — Nourali Mansoury
(74) *Attorney, Agent, or Firm* — James T. Hagler

(57) ABSTRACT

Methods and apparatus for communicating IP datagrams efficiently within communication links employing variable frame sizes bundles IP datagrams into data payloads. The number of datagrams that can fit within a current frame size is determined, a bundle header indicating that the bundle header is associated with a bundled IP datagram is generated that includes information for unpacking bundled IP datagrams. The bundle header is joined to one or more IP datagrams to form a data payload that is communicated as a frame payload without indicating in a frame header that the frame includes bundled IP datagrams. Information in the bundle header enables a receiver processor to extract the IP datagrams from the frame payload without requiring modifications to the frame header. A bundle header may precede each IP datagram, or one bundle header may include a map IP datagrams in the frame payload.

24 Claims, 11 Drawing Sheets

US 8,170,027 B2

APPARATUS AND METHOD FOR SUPPORTING HIGHER DATA RATES ON LINKS WITH VARIABLE FRAME SIZES

FIELD OF THE INVENTION

The present invention relates to digital communication methods, and more particularly to methods for supporting high data rates on links which support variable frame sizes.

BACKGROUND

Advances in wired and wireless data communication technologies are rapidly increasing the data rates and capacities of communication networks. New high speed data links are being implemented which will be accessible by mobile devices and personal computers. Communication link layer frames for new high speed data links are often quite large, several kilobytes or more. Despite the increased size of link layer frames, data throughput may nevertheless be limited because the size of Internet Protocol (IP) packets transported in the frame is limited. For all practical purposes the maximum size of an IP packet is about 1514 bytes. This limit is imposed by IEEE Standard 802.3, the most common link layer on the Internet. Since most link layers require transmitting one IP datagram per frame there is much unused bandwidth.

Data throughput is also limited by the frequency at which frames can be transmitted. While the frame size enabled by high speed links may be variable, the frame rates may be fixed. This is typically true of wireless links where the frame rate is fixed but the size of the link layer frame is determined by the current radio frequency (RF) conditions. When RF conditions are favorable, the wireless links may implement large frame sizes. In such networks high data rates are achieved (at the link layer) by transmitting large data blocks at a fixed frame rate. The fixed frame rate, however, is a limiting factor when transferring IP datagrams which are typically limited in size to 1514 bytes. In this case even if the physical layer can support a larger frame because RF conditions are favorable, IP data transmissions are limited to 1514 byte packets, thereby limiting the amount of data that can be transmitted in any one frame. Thus, for a link layer frame rate of 100 μs (i.e., 10,000 frames/second) a high speed link capable of transmitting data at 40 megabytes per second (MBPS) will nevertheless be limited to only 15 MBPS of IP data.

SUMMARY

The various embodiments enable transmitting IP data more efficiently on links which support variable frame sizes, thereby enabling higher data transmission rates when link conditions permit the use of larger frame sizes. A current frame size employed by the communication link is determined. The number of IP datagrams pending for transmission that can fit within the current frame size is determined. A bundle header is generated that includes an information indicating it is associated with a bundled IP datagram. The bundle header also includes information for unpacking the bundled IP datagrams. The bundle header is joined with one or more IP datagrams to form a data payload. The data payload is then communicated as the payload of a communication link frame without indicating in the frame header that the frame includes bundled IP datagrams. Information provided within the bundle header indicates that the frame payload contains bundled IP datagrams and enables a receiver processor to extract the IP datagrams from the payload. A bundle header may be provided for each IP datagram, or a single bundle header may include a map of all IP datagrams bundled in the frame payload.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used herein to mean "serving as an example, instance, or illustration." Any implementation described herein as "exemplary" is not necessarily to be construed as preferred or advantageous over other implementations.

Figure 10:
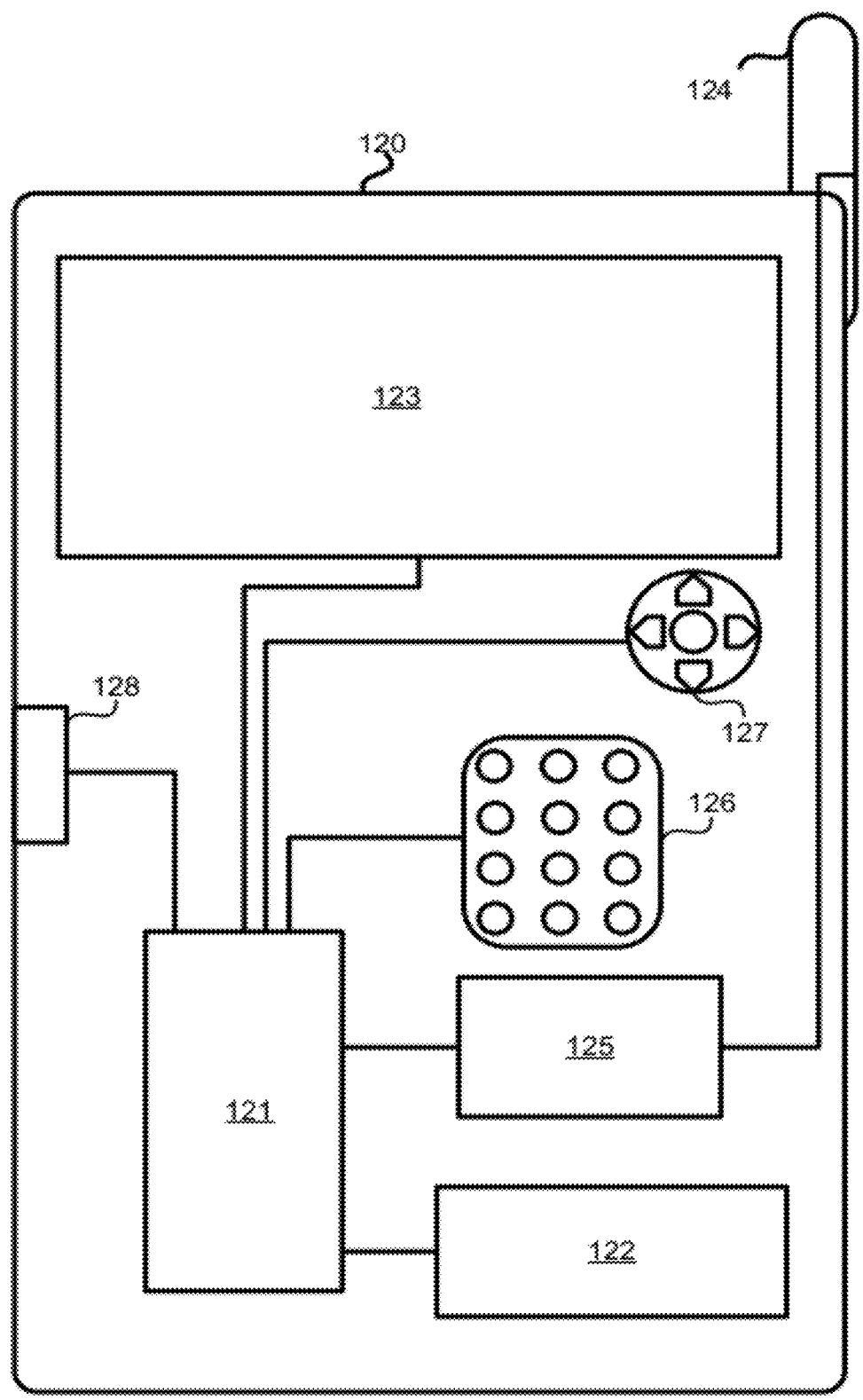
FIG. 10 is a component block diagram of a mobile device suitable for implementing the various embodiments.

As used herein, the terms "computer" and "computer system" are intended to encompass any form of programmable computer as may exist or will be developed in the future, including, for example, personal computers, laptop computers, mobile computing devices (e.g., cellular telephones, personal data assistants (PDA), palm top computers, and multifunction mobile devices), main frame computers, servers, and integrated computing systems. A computer typically includes a software programmable processor coupled to a memory circuit, but may further include the components described below with reference to FIGS. 10 and 11.

As is well known in communications arts, information transmitted via the Internet in IP format generally is broken down into packets that are transmitted in IP datagrams. IP datagrams include a data payload preceded by a header including the destination and receiving address, and information about the payload to enable the destination processor to link together related payloads to reconstruct the original message.

IP datagrams are communicated through various networks including the Internet in communication packets unique to each particular type of communication link. In the communications art, the communication link and the software processes and communication link protocol associated with the link are referred to as the "link layer." Typically communication links communicate data in blocks which begin with a header and may conclude with an end marker which referred to as frames. For clarity, the term "frame" is used in the description of the embodiments and in the claims to refer to the communication link layer frames. Frames include a header portion, referred to herein as the "frame header," and a data payload section, referred to herein as the "frame payload." When IP datagrams are being transmitted by the link layer, an IP datagram is included in the frame payload. Frames are transmitted over the physical layer, which refers to the circuitry that transmits information as a series of electrical signals conducted over wires or RF signals transmitted from one transceiver to another.

The IP protocol permits IP datagrams to be passed through a variety of different communication links (i.e., different link layers) on their way to a destination computer. For example, IP datagrams may travel via a wireless communication link to a receiver which communicates them via a local area network to a server where they are transmitted via the Internet to a destination computer. This ability to separate the assembly and processing of IP datagrams from the communication links which transmit them has helped make the Internet so popular.

The promise of instant broadband communications to personal computing devices offered by high speed data links is currently limited by the size limits placed on IP datagrams. With IP datagrams effectively limited to about 1514 bytes by IEEE Standard 802.3, maximum transmission data rates are limited by the frame rate of the communication link. Typical wireless links have a fixed frame rate even though the frame size may be increased when RF conditions permit. As a result, a wireless data link capable of transmitting up to 40 MBPS with a frame rate of 100 μs (i.e., 10,000 frames/second) will nevertheless be limited to only 15 MBPS of IP data.

To overcome this limitation, the various embodiments enable bundling multiple IP datagrams (i.e., IP packets including their headers) into a single large frame for transmission over high speed data links. Since the size of frames in high speed links may vary, meaning that the size of the frames changes often in response to the link quality (e.g., noise on the communication link or rate of errors detected in received frames), the number of IP datagrams that can be bundled in a single frame may be adjustable from frame to frame. The embodiments accomplish bundling with minimal impact on either link layer hardware/software or IP layer software, allowing significant increases in IP communication speeds over high speed links without requiring significant changes to the communication infrastructure or basic link protocols.

In overview, the various embodiments may accomplish bundling by implementing a bundling process after IP datagrams have been assembled by an IP protocol layer and prior to passing the IP datagrams to the link layer for transmission. This enables IP datagram bundling to be accomplished without changes to headers or processing of either IP datagrams or frames. This bundling is accomplished by assembling a number of IP datagrams and one or more bundle headers into a bundled data payload before the bundled data payload is transmitted within a single frame payload. The one or more bundle headers are positioned within the bundled data payload in a location and contain information so that a receiving processor unpacking the frame payload can recognize and separate out the IP datagrams. Separated IP datagrams recovered from the bundled data payload can then be passed to and processed by IP protocol layer software as if the datagrams had been received in the ordinary manner (i.e., one IP datalink per frame). Data payloads received from the link layer which do not included bundled IP datagrams are unaffected and therefore processed in the ordinary manner. Data payloads received from the link layer that include only a single IP datagram (i.e., payloads from frames that did not transmit bundled IP datagrams) are similarly unaffected and, therefore, processed in the ordinary manner consistent with current protocols and implementations.

The embodiments described herein include two different methods for identifying and demarcating bundled IP datagrams within a frame payload. In a first method, the bundled data payload includes a bundle header positioned adjacent to each IP datagram so that processing software can recognize that a following block of bytes, as specified in the bundle header, contains an IP datagram. In a second method, the bundled data payload includes a single bundle header positioned ahead of all IP datagrams which identifies the payload as a bundle of IP datagrams and provides a map to enable processing software to parse the received bundled data payload into its constituent IP datagrams. While the following description focuses on these two embodiment methods, other methods may be implemented for bundling IP datagrams into variable frames without departing from the spirit and scope of the invention as defined in the claims.

One approach for increasing data throughput on high speed links is to bundle multiple IP datagrams into frames. However, such a simple approach will result in a number of implementation problems that are likely to reduce, rather than increase data through put as well as increase implementation complexity. Variable length frames may not match the size of bundled IP datagrams, so simply bundling IP datagrams will result in datagrams being fragmented and transmitted in separate frames. While IP packet fragmentation can be accomplished, such methods are likely to add complexity in terms of pre-transmission and post-reception processing, as well as requiring transmission of additional data to enable fragmented packets to be reassembled. Since frame sizes are variable and may change frequently in response to communication link characteristics, this problem cannot be resolved by designating a fixed number of IP datagrams bundled into frames. Further, when the frame size drops to something smaller than the length of two IP datagrams, bundling IP datagrams will decrease overall data throughput. Thus, a solution that always implements IP bundling, such as in response to negotiated or configured link settings, is undesirable.

Figure 1A:
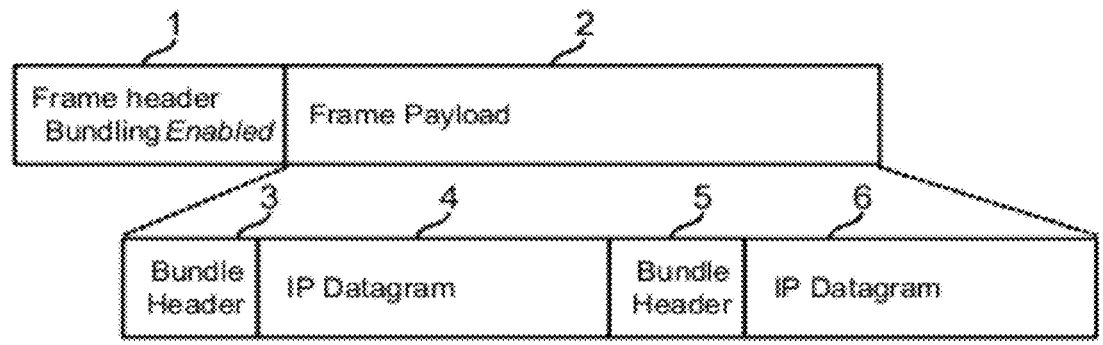
FIGS. 1A and 1B are message packet diagrams illustrating a method for bundling IP datagrams into a link frame with bundling enabled (1A) and disabled (1B).
Figure 1B:
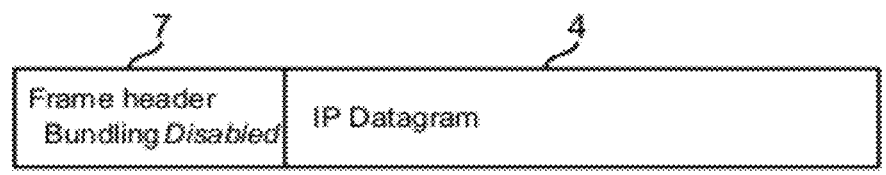

A first approach for bundling IP datagrams into frames on a frame-by-frame basis is illustrated in FIGS. 1A and 1B. In this approach, a bit within the link frame header 1 is reserved for identifying whether the payload 2 of the frame includes bundled IP datagrams. Any available bit within the frame header may be used for this purpose. If this "frame bundling enabled" bit is set, indicating that bundling is enabled, as indicated in the frame header 1 shown in FIG. 1A, the frame payload 2 will include two or more IP datagrams 4, 6. Each IP datagram 4, 6, may be preceded by a bundle header 3, 5 which indicates the length of the following IP datagram. With this structure, a receiving processor will be informed by the particular frame bundling enabled bit in the frame header that the received frame payload includes bundled IP datagrams, and from that information be informed to look for a bundle header 3 within the frame payload 2 in order to determine how many following bytes are associated with a bundled IP datagram 4. Thus, a receiving processor can read the frame payload 2 and use the bundle header 3, 5 information to lift out the corresponding IP datagrams 4, 6. In frames in which IP packet bundling has been disabled the frame bundling enabled bit will not be set in the frame header 7, which informs a receiving processor that the frame payload only includes a single IP datagram 4 as illustrated in FIG. 1B.

While this approach enables bundling of a number of IP datagrams which may employ transport protocols other than IPv4 or IPv6, it requires that the link layer define a frame header bit to indicate the bundling is occurring. This frame header frame bundling enabled bit requires a modification to the link layer that may not be backwardly compatible with existing link layer software and hardware. Additionally, this approach requires adding a bit to the frame header in protocols which do not have a spare bit in the frame header for such a purposes (e.g., EVDO). Adding such an extra bit can be problematic for wireless link layers since wireless communication links are designed to minimize the size of headers. In the case of wireless link layers, adding one more bit may either force link layer headers to be much bigger or significantly increase their processing complexity. Thus, while the approach illustrated in FIGS. 1A and 1B will enable IP datagram bundling on a frame-by-frame basis, the approach has disadvantages which may limit its adoption or performance.

The various embodiments provide an alternative solution which does not modify the link frame header nor impose the burden of bundling IP datagrams into the frame payload upon the link layer software. Two embodiments are illustrated in FIGS. 2A, 2b and FIGS. 3A, 3B, respectively.

Figure 2A:
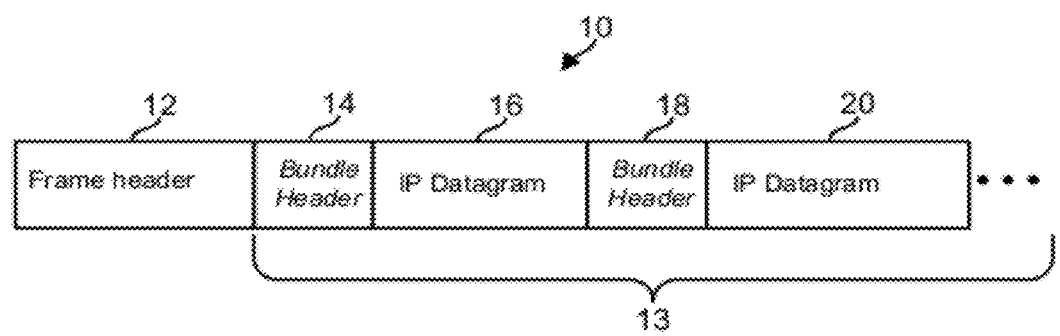
FIGS. 2A and 2B are message packet diagrams illustrating an embodiment for bundling IP datagrams into a link frame with bundling enabled (2A) and disabled (2B).
Figure 2B:
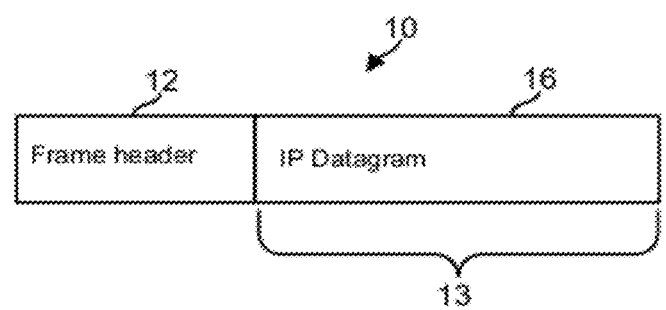

In the first embodiment illustrated in FIGS. 2A and 2B, IP datagrams 16, 20 are bundled with respective bundle headers 14, 18 to form a data block that is provided to the link layer for transmission as the payload of the next frame 10. These figures illustrate a frame 10 as a block including a frame header 12 and a frame payload 13. The frame payload 13 includes a number of IP datagrams 16, 20 when bundling is implemented in a frame 10 (FIG. 2A) or a single IP datagrams 16 when no bundling is accomplished (FIG. 2B). There is no modification to the frame header 12 required to indicate that the frame payload 13 includes bundled IP data packets. Instead, each IP datagram 16, 20 is assembled with a preceding bundle header 14, 18 which identifies itself as a bundle header. In a particular implementation, the most significant bit in the bundle header 14 is set to "1" which indicates that the bundle header is not an IP datagram header. This is because the IPv4 and IPv6 protocols require that the most significant bit in an IP packet header equal "0". More particularly, IPv4 requires the first nibble (i.e., the first four bits) to equal "4" (i.e., 0100) and IPv6 requires the first nibble to equal "6" (i.e., 0110). Thus, by setting the most significant bit to "1," a receiving processor can be informed to read the contents of the bundle header 14 to determine how to parse the frame payload 13 to recover bundled IP datagrams. For example, if the first bit in the bundle header 14 is set to "1," the remaining 15 bits in a two byte bundle header 14 can be used to identify the length of the following IP datagram 16. In another implementation, the first nibble may be equal to a value other than "4" (i.e., 0100) or "6" (i.e., 0110). Alternatively, the bundle header 14 may identify the offset corresponding to the end of the IP datagram 16, the offset corresponding to the start of the next bundle header 18, or some other value that the receiving processor can use to determine and select the subsequent bytes constituting the IP datagram.

In an embodiment the bundle header is two bytes in length which minimizes the length of the bundle header while enabling the bundling of IP datagrams up to the length of approximately 32 kilobytes if the first bit in the bundle header 14, 18 is set to "1" to indicate IP datagram bundling. However, the bundle header may be one byte or more than two bytes in length without departing from the spirit of the present invention.

The receiving processor can use the information in each bundle header 14, 18 to select the specified number of bytes as a IP datagram that can be passed immediately to the IP layer within the computer software architecture. After copying one IP datagram from the frame payload, a receiving processor can then interrogate the next bundle header 18 to determine the length of the next IP datagram 20 and use that information to select the specified number of bytes. This process can then continue until an end of frame symbol or indication of the end of the frame payload is reached. While FIG. 2A shows just two IP datagrams, many more IP datagrams may be included depending upon the length of the frame and the various lengths of the included IP datagrams.

If IP datagram bundling is not implemented then the payload of a link frame will simply include a single IP datagram 16, as illustrated in FIG. 2B. In this case, the link frame header 12 is exactly the same as would be the case for a frame including bundled IP datagrams. Thus, no change to the link layer software is required since there is no frame bundling enabled flag in the frame header to be set.

Figure 3A:
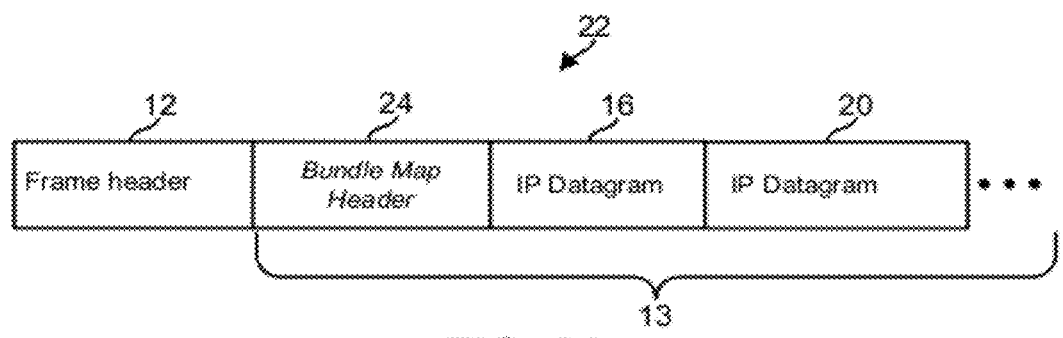
FIGS. 3A and 3B are message packet diagrams illustrating an alternative embodiment for bundling IP datagrams into a link frame with bundling enabled (3A) and disabled (3B).
Figure 3B:
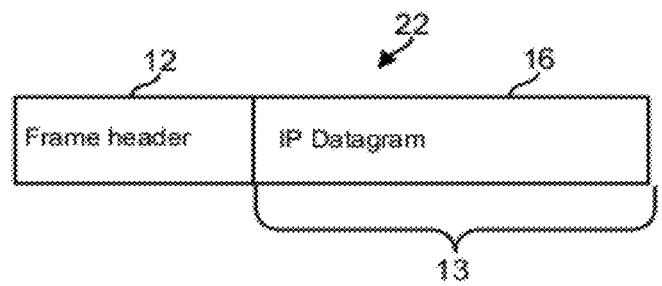

In the second embodiment illustrated in FIGS. 3A and 3B multiple IP datagrams 16, 20 may be bundled within a single frame 22 with a single bundle mapped header 24 included at the start of the frame payload 13. These figures illustrate a frame 22 as a block including a frame header 12 and a frame payload 13. The frame payload 13 includes a number of IP datagrams 16, 20 when bundling is implemented in a frame 22 (FIG. 3A) or a single IP datagrams 16 when no bundling is implemented (FIG. 3B). In this embodiment the bundle header 24 includes a map of all of the bundled IP datagrams 16, 20 within the remaining portion of the frame payload 13. The bundle header 24 includes information which identifies it as a bundle header for bundled IP datagrams. In a particular implementation, the most significant bit in the bundle header 24 is set to "1" which indicates that the bundle header 24 is not an IP packet header. Again, this is because the IPv4 and IPv6 protocols require that the most significant bit in an IP packet header equal "0". By setting the most significant bit to "1" a receiving processor can be informed that it should read the contents of the bundle header 24 to determine how to parse the frame payload 13. For example, if the first bit is set to "1," the next seven bits within the first byte can be used to identify the length of the rest of the bundle header 24, and the identified number of subsequent bytes in the bundle header 24 can be used to provide a map to the bundled IP datagrams contained in the rest of the frame payload 13. This map may be in the form of a list of the lengths of each included IP datagram 16, 20, the offsets (e.g., from the payload start or from the end of the bundle header 24) of each included IP datagram, or some other information that a receiving processor can use to parse the remaining portion of the frame payload to recover all of the included IP datagrams 16, 20.

The length of the bundle header 24 will vary depending upon the number of IP datagrams included within the link frame payload 13. The more IP datagrams included within the link frame payload 13, the more information that must be included in the map within the bundle header 24.

Similar to the first embodiment, if IP datagram bundling is not implemented then the payload of a link frame will simply include a single IP datagram 16 as illustrated in FIG. 3B. In this case, the link frame header 12 is exactly the same as would be the case for a frame including bundled IP datagrams. Again, no change to the link layer software is required to set a bundling indicator flag in the frame header.

The embodiments illustrated in FIG. 2A and FIG. 3A enable bundling of IP datagrams within variable length frames, which can dramatically increase data throughput when wire or RF conditions are favorable, without requiring a modification of the link layer software in both the sending and receiving processor. Since the indication of whether a frame a payload includes bundled IP datagrams is provided in a bundle header within the payload, a receiving processor does not need to know in advance whether each frame it receives contains bundled IP datagrams or not. This enables bundling on a frame-by-frame basis. Thus, the implementation of bundling, and the number of IP datagrams bundled within each frame can be adjusted as the communication link quality varies without introducing significant complexity to either the link layer or the IP layer software.

The generation of link frame payloads as illustrated in FIGS. 2A and 3B can easily be implemented in software in the transmitting processor, such as in an intermediate or "shim" layer that operates between the IP protocol layer and the link layer. This software architecture implementation is described more fully below with reference to FIG. 9.

Figure 4:
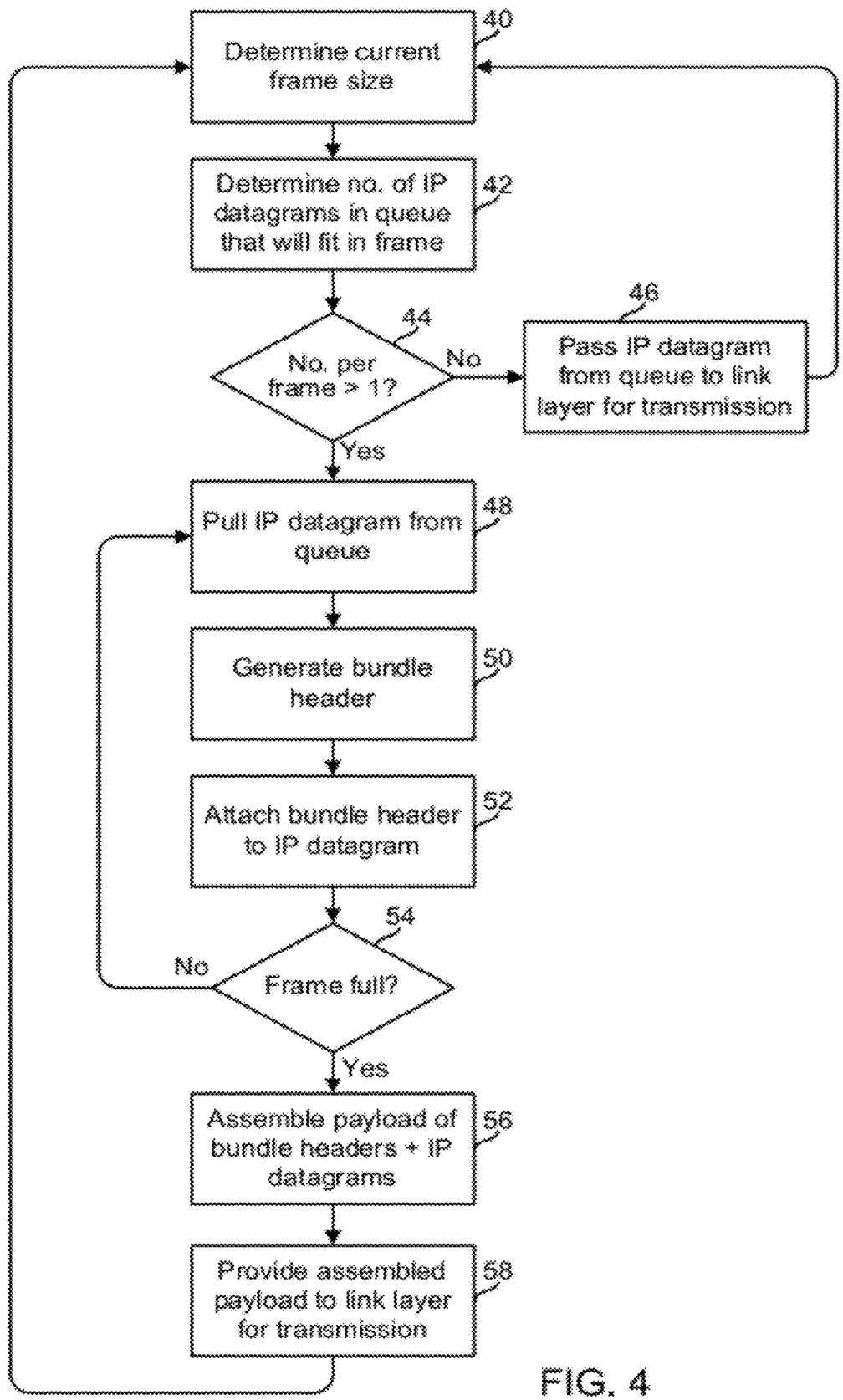
FIG. 4 is a process flow diagram illustrating an embodiment method for bundling IP datagrams into link frames in accordance with the embodiment illustrated in FIG. 2A.

An example method for generating link frame payloads for bundling IP datagrams on a frame-by-frame basis is illustrated in FIG. 4. When one or more IP datagrams is to be communicated, a computer processor configured by software may determine the current frame size implemented by the link layer, step 40. This determination may be accomplished by checking a value contained within a buffer used to control the link layer, such as a buffer indicating the current frame size, or by querying link layer software for this value. The determination of the current frame size, step 40, may be accomplished periodically, such as every few seconds, whenever IP datagrams are being transmitted, or after a certain number of IP datagrams have been transmitted. By checking the frame size frequently, the method is able to accurately match the number of bundled IP datagrams to the current frame size implemented by the link layer.

Using the current frame size value, the processor can determine the number of IP datagrams stored in a queue for transmission that will fit within the current frame size, step 42. This step may be accomplished by inspecting the IP datagrams placed in a queue for transmission by the IP protocol layer to determine the length of each datagram. The number of IP datagrams that can be bundled within a frame can be calculated by sequentially subtracting the length of each IP datagram in the queue plus two bytes (for example) for the bundle header until the remaining frame payload length is less than the next IP datagram in the queue. This process accommodates IP datagrams of varying length as well as frames of varying length. As part of this process, the processor may move the IP datagrams from the queue to a buffer memory location or otherwise identify the IP datagrams that will be bundled into the next frame.

In some communication situations, such as wireless data links suffering from adverse RF conditions, the frame size may be reduced such that only a single IP datagram can fit within the frame length. For this reason, the processor may test whether the determined number of IP datagrams that can fit within the frame is greater than 1, test 44. If not, bundling of IP datagrams cannot be accomplished without fragmenting IP packets, so the processor may simply pass the next IP datagram in the queue to the link layer for transmission, step 46. Thus, if communication conditions do not support frame sizes which allow for the bundling of IP datagrams within frames (i.e., the number of IP datagrams per frame is not greater than 1 and test 44="No"), normal IP communications can proceed consistent with current practice. When this is the case, the frames will appear as illustrated in FIGS. 2B and 3B.

If the current frame size will enable bundling of more than one IP datagram per frame (i.e., test 44="Yes"), the processor may pull the next IP datagram from the queue or from another buffer if it has already been moved from the IP protocol transmission queue, step 48. Using the size of the IP datagram, the processor can generate the bundle header, step 50. As mentioned above, in an embodiment the most significant bit in this bundle header will be set to "1" and the remainder of the header will be used to specify the length of the associated IP datagram. It should be noted that the use of the most significant bit in the bundle header to indicate bundling is a preferred embodiment but is not the only embodiment encompassed within the claims. Instead, the information indicating that the frame payload includes bundled IP datagrams may be included in other portions of the bundle header, such as in a particular byte value, two byte value or bit pattern.

The generated bundle header is appended to the corresponding IP datagram, step 52. The result block of bytes may be stored in memory or retained within a buffer while the processor determines whether the frame is full or whether another IP datagram can be bundled within the next frame to be transmitted, test 54. For example, as each IP datagram is pulled from the IP protocol transmission queue the number of IP datagrams that can be fit within the next frame determined in step 42 may be decremented. In that implementation test 54 may simply determine whether the remainder is greater than zero. If there is another IP datagram to be bundled (i.e., test 54="Yes"), the processor may return to step 48 to pull the next IP datagram from the queue and repeat the process of generating a bundle header, step 50, and appending the bundle header to the next IP datagram, step 52. Once the next frame is full or all IP datagrams that are to be bundled within the next frame have been processed (i.e., step 54="No"), the processor may assemble a data payload for the next frame by appending each of the assembled bundle headers plus IP datagrams into a single contiguous block of data bytes, step 56. In this embodiment, the data payload will include a plurality of IP datagrams interspersed with their respective bundle headers as illustrated in FIG. 2A. The assembled data block can then be provided to the link layer for transmission as if it were a large block of data, step 58. The link layer then transmits the data payload in the next frame in the conventional manner well known in the art, and the processor returns to the beginning of the process to determine the frame size, step 40, and the number of IP datagrams that can fit within that frame, step 42. This process and continues so long as IP datagrams are in the queue for transmission.

Figure 5:
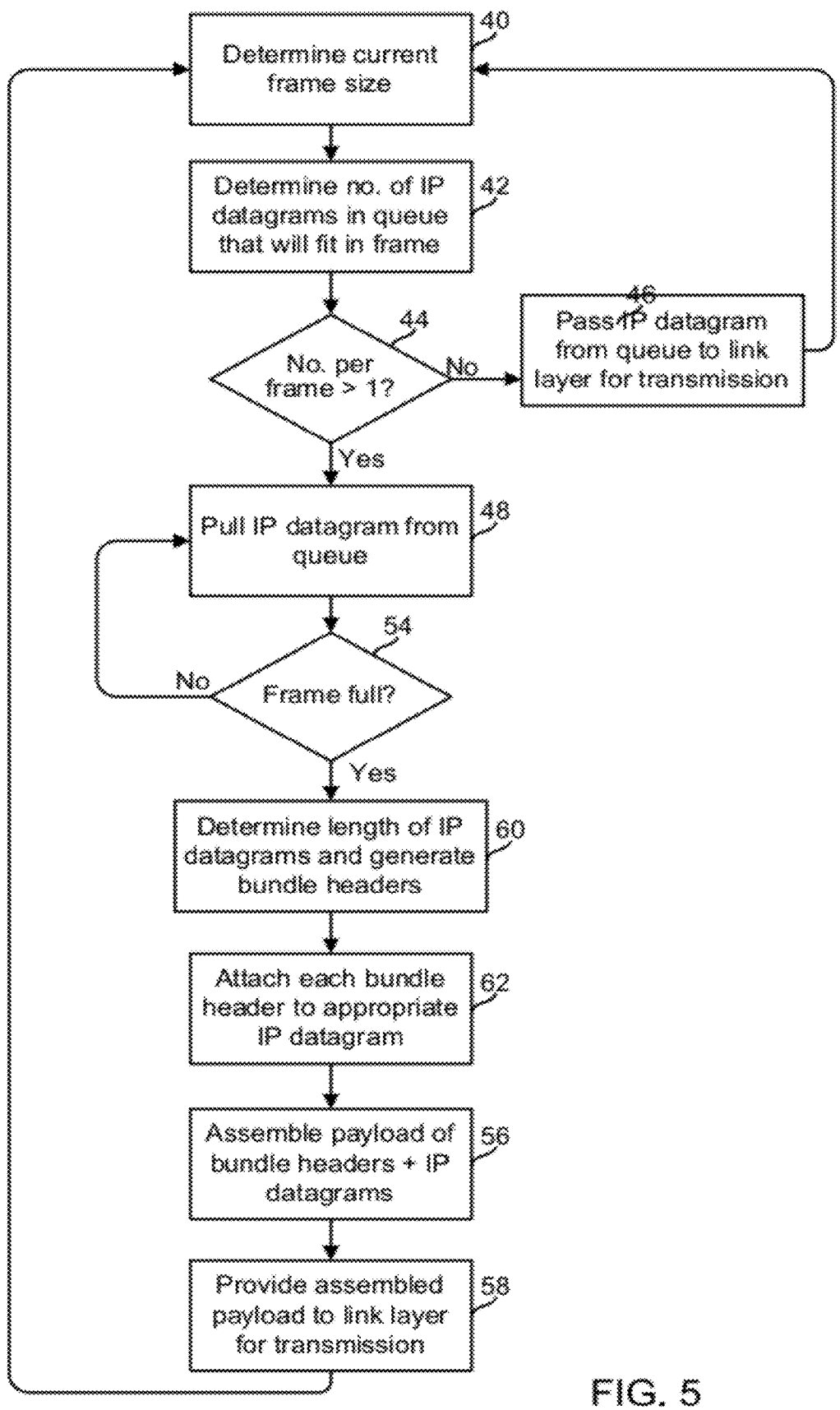
FIG. 5 is a process flow diagram illustrating an alternative embodiment method for bundling IP datagrams into link frames in accordance with the embodiment illustrated in FIG. 2A.

While the example method illustrated in FIG. 4 generates each bundle header as its associated IP datagram is pulled from the transmission queue, the bundle headers may also be generated in one step and sequentially attached to their associated IP datagrams. FIG. 5 illustrates alternative example method steps for generating bundled IP datagrams for transmission in variable length frames in which the bundle headers are generated in one step. As with the method illustrated in FIG. 4, a transmitting processor determines the size of the next transmission frame when IP datagrams are queued for transmission, step 40, and determines the number of IP datagrams in a queue that will fit within that frame size, step 42. If only a single IP datagram will fit within the frame (i.e. test 44="No"), the next IP datagram in the queue is passed to the link layer for transmission. However, if more than one IP datagram will fit within the frame (i.e., test 44="Yes"), each of the IP datagrams in the queue that will be bundled within the next frame may be pulled from the transmission queue and stored in memory, step 48 and test 54. Once all of the IP datagrams to be bundled within the next frame have been pulled from the transmission queue (i.e., test 54="No"), the processor may determine the length of each of the IP datagrams stored in memory and use that information to generate a bundle header for each IP datagram, step 60. The processor then may attach each bundle header to its appropriate IP datagram, step 62, and assemble all of the bundle headers and IP datagrams into a single data block, step 56. The assembled data block can then be provided to the link layer for transmission as if it were a large block of data, step 58. At this point, the data payload is transmitted in the next frame by the link layer, and the processor returns to the beginning of the process to determine the current frame size, step 40, and the number of IP datagrams that can fit within that frame, step 42. This process and continues so long as IP datagrams are in the queue for transmission.

In a further alternative, the length of each of the IP datagrams may be determined as part of the step of determining the number of IP datagrams to be bundled into the next frame, step 42. In that case, the generation of the bundle headers, step 60, maybe accomplished by the processor before each of the IP datagrams are pulled from the transmission queue, step 48. The sequence of steps illustrated in FIGS. 4 and 5 may be changed without departing from the spirit of the present invention or the scope of the claims.

Figure 6:
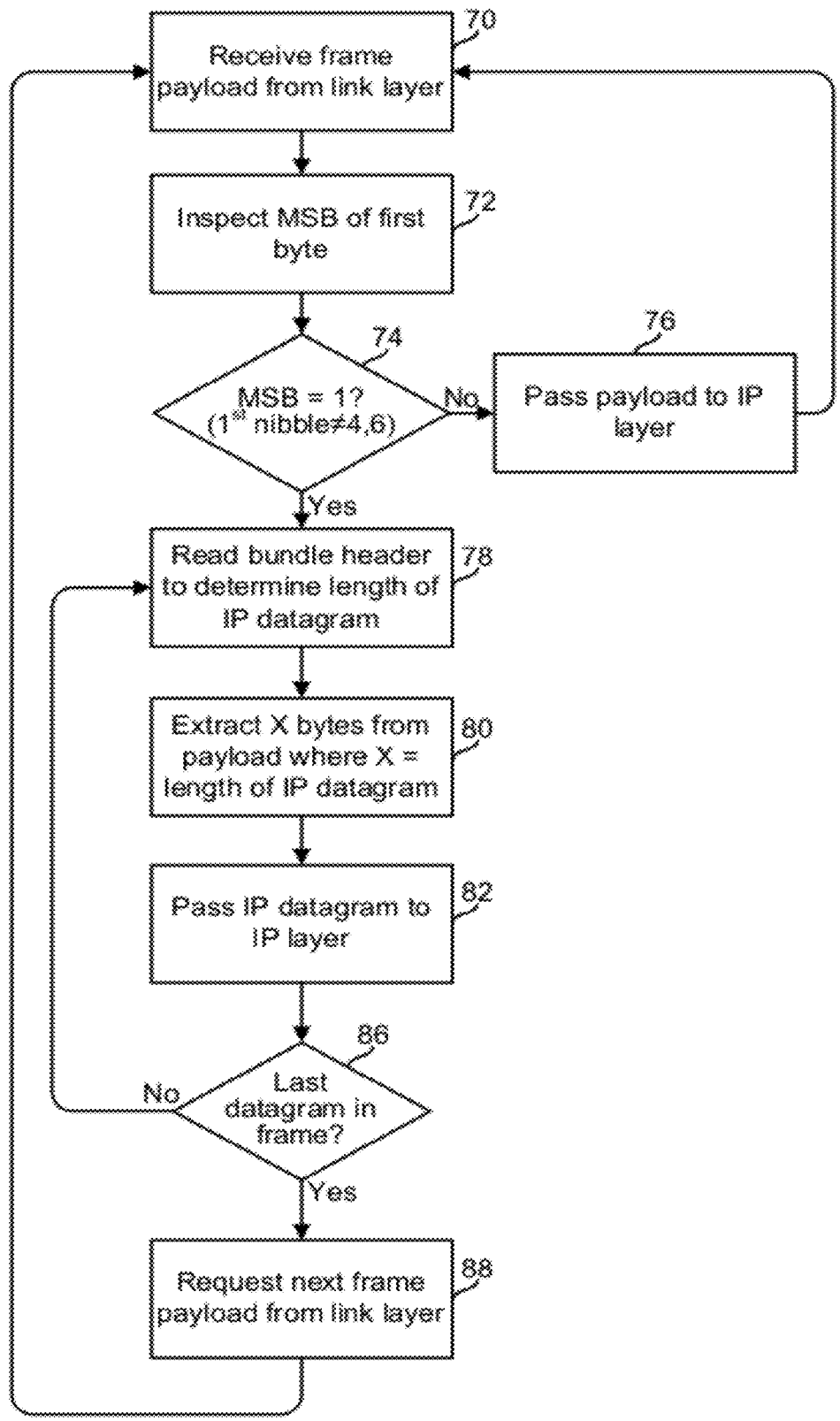
FIG. 6 is a process flow diagram illustrating an embodiment method for unpacking bundled IP datagrams formatted in accordance with the embodiment illustrated in FIG. 2A.

Bundled IP datagrams included within frames in the manner described above with reference to FIG. 2A may easily be unpacked for processing using the information included within the bundle headers. Example method steps that may be implemented by a receiving processor are illustrated in FIG. 6. When each frame payload is received from the link layer, step 70, the processor may inspect the most significant bit (MSB) of the first byte of the payload (or the first byte after the frame header if the frame header is included in the received frame), step 72, to determine whether it is a "0" or "1", test 74. Alternatively, the processor may inspect the first nibble to determine if its value is not 4 or 6. If the most significant bit is a "0" or the first nibble is 4 or 6 (i.e., test 74="No"), this indicates that the payload contains a normal IP datagram so the payload is simply passed directly to the IP protocol layer, step 76, for processing in the traditional manner. If the most significant bit is a "1" or the first nibble to determine if its value is not 4 or 6 (i.e., test 74="Yes"), this indicates that the frame payload may include bundled IP datagrams so the processor reads the rest of the bundle header to determine the length of the associated IP datagram, step 78. It should be noted that the use of the most significant bit in the bundle header to indicate bundling is a preferred embodiment but is not the only embodiment encompassed within the claims. Instead, the information indicating that the frame payload includes bundled IP datagrams may be included in other portions of the bundle header, such as in a particular byte value, two byte value or bit pattern. In such embodiments, the shim layer 114 (see FIG. 9) software will be configured to search for and recognize the particular value or bit pattern within the bundle header in order to distinguish the frame payload as one containing bundled IP datagrams.

Using the length or offset information obtained from the bundle header, the processor extracts the corresponding number of bytes from the frame payload to obtain the IP datagram, step 80, and passes the IP datagram to the IP protocol layer, step 82. The processor then may determine whether the last datagram in the payload or frame has been processed, test 86. If the last datagram in the payload or frame has not been processed (i.e., test 86="No"), a processor may return to the step of reading the next bundle header to determine its length, step 78, use that information to extract the next IP datagram from the payload, step 80, and pass the extracted IP datagram to the IP protocol layer, step 82. This process continues until all bundled IP datagrams have been processed (i.e., test 86="Yes"). At this point, the processor may request the next frame payload from the link layer, step 88, and repeat the process by returning to step 70.

Figure 7:
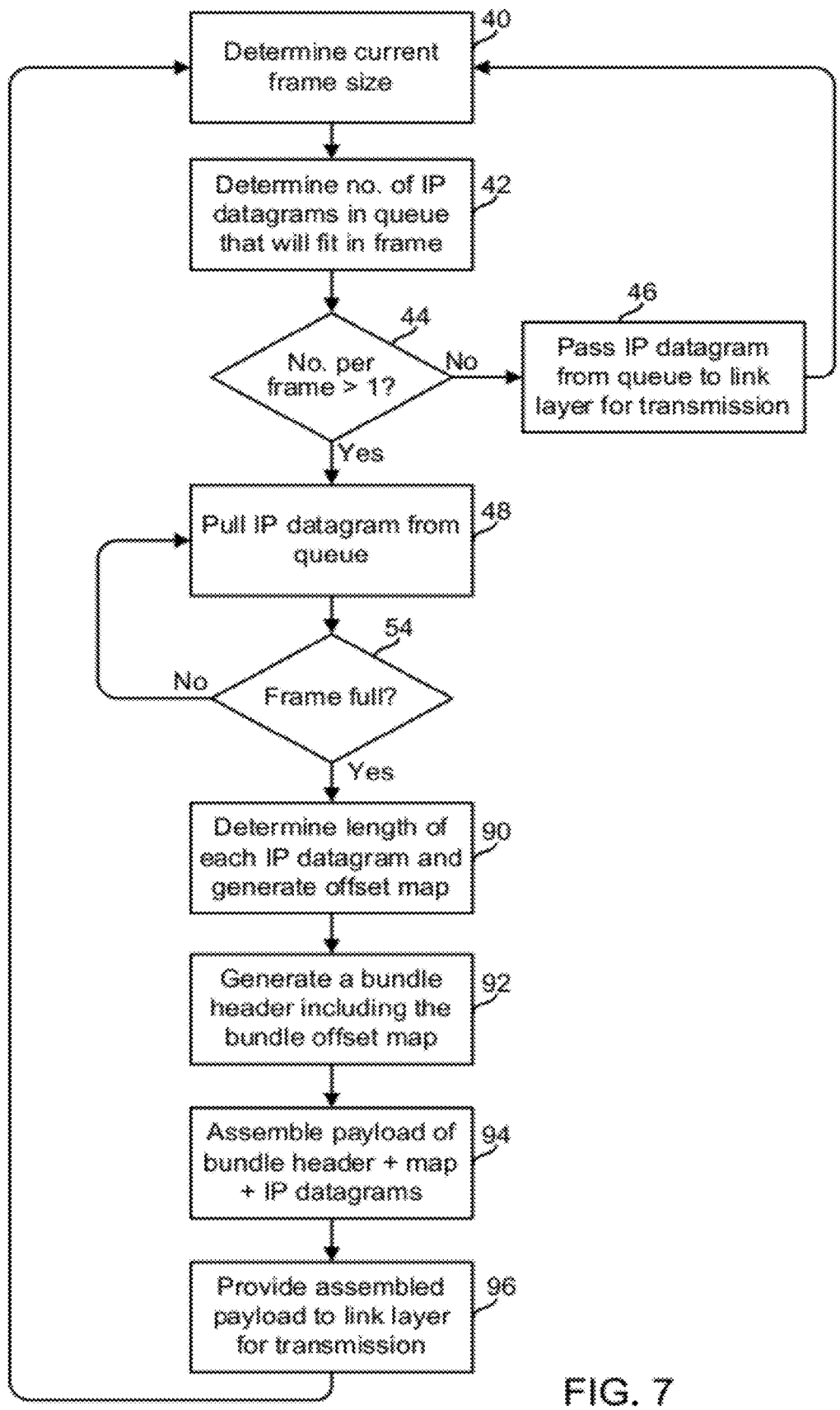
FIG. 7 is a process flow diagram illustrating an embodiment method for bundling IP datagrams into link frames in accordance with the embodiment illustrated in FIG. 3A.

As discussed above with reference to FIG. 3A, a second embodiment accomplishes bundling of IP datagrams within variable length frames by using a single bundle header that includes a map to the bundled IP datagrams. Example method steps which may be implemented to generate payloads for frames according to this embodiment are illustrated in FIG. 7. When one or more IP datagrams is to be communicated, a computer processor configured by software may determine the current frame size implemented by the link layer, step 40. This determination may be accomplished as described above with reference to FIG. 4. Using the current frame size value, the processor then can determine the number of IP datagrams in the queue for transmission that will fit within that frame size, step 42. This step may also be accomplished as described above with reference to FIG. 4. If communication conditions do not support frame sizes which allow for the bundling of IP datagrams within frames (i.e., the number of IP datagrams per frame determined in step 42 is not greater than 1 so test 44="No"), the processor may simply pass the next IP datagram in the queue to the link layer for transmission, step 46.

If more than one IP datagram will fit within the frame (i.e., test 44="Yes"), each of the IP datagrams in the queue that will fit within the next frame may be pulled from the transmission queue and stored in memory, step 48 and test 54. Once all of the IP datagrams to be bundled within the next frame have been pulled from the transmission queue (i.e., test 54="No"), the processor may determine the length of each of the IP datagrams stored in memory and generate an offset map that can be used to identify the starting and ending location of each IP datagram within a bundled data payload, step 90. Using this offset map, the processor can generate a bundle header including the onset map with the most significant bit set to "1," step 92. As discussed above, the use of the most significant bit to indicate IP datagram bundling is but one example embodiment and other bit patterns within the bundle header may be used to communicate this information.

The generated bundle header may then be combined with all of the associated IP datagrams into a payload data block, step 94, which is passed to the link layer for transmission, step 96. The payload data block may be formed by concatenating the bundle map header together with all of the IP datagrams to be bundled into the next frame. At this point, the payload is transmitted in the next frame by the link layer in the conventional manner, and the processor returns to the beginning of the process to determine the frame size, step 40, and the number of IP datagrams that can fit within that frame, step 42. This process continues so long as IP datagrams are in the queue for transmission. The result of this process is the transmission of frames such as illustrated in FIG. 3A.

Figure 8:
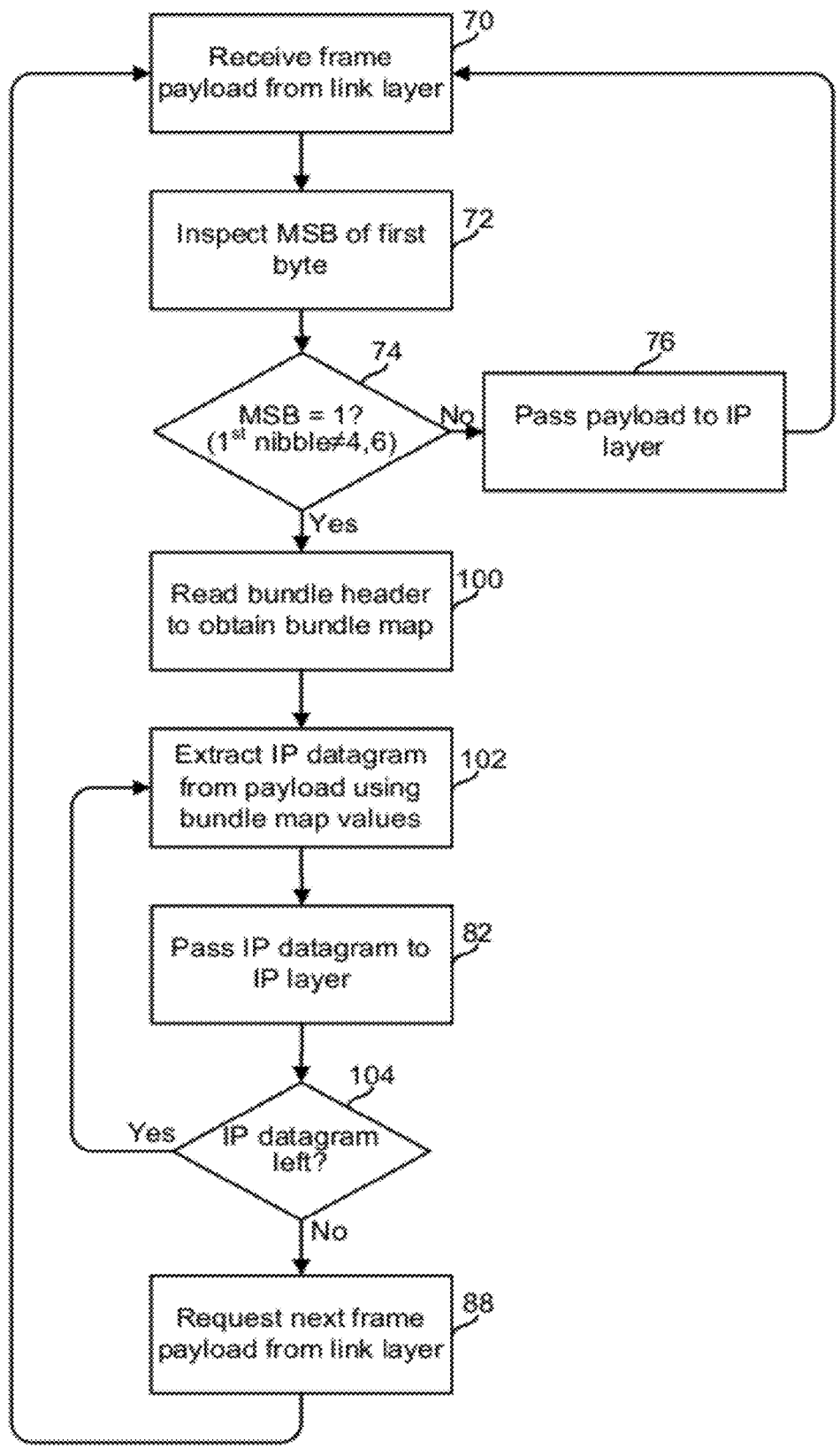
FIG. 8 is a process flow diagram illustrating an embodiment method for unpacking bundled IP datagrams formatted in accordance with the embodiment illustrated in FIG. 3A.

Bundled IP datagrams included within frames in the manner described above with reference to FIGS. 3A and 7 may easily be unpacked by a receiver processor using the map information included within the bundle header. Example method steps that may be implemented by a receiving processor are illustrated in FIG. 8. When each frame payload is received from the link layer, step 70, the processor may inspect the most significant bit of the first byte of the payload (or the first byte after the frame header if the frame header is included in the received frame), step 72, to determine whether it is a "0" or "1", test 74. Alternatively, the processor may inspect the first nibble to determine if its value is not 4 or 6. If the most significant bit is a "0" or the first nibble is 4 or 6 (i.e., test 74="No"), this indicates that the payload contains a normal IP datagram so the payload is simply passed directly to the IP protocol layer, step 76, for processing in the conventional manner. If the most significant bit is a "1" or the first nibble to determine if its value is not 4 or 6 (i.e., test 74="Yes"), this indicates that the payload may include bundled IP datagrams so the processor reads the rest of the bundle map header to obtain the bundle map, step 100. As discussed above, in other embodiments the processor may look to other bits, bit patterns or byte values to determine whether the frame payload includes bundled IP datagrams.

Using the map information contained within the bundle header, the processor extracts and IP datagram from the payload, step 102, and passes the extracted IP datagram to the IP protocol layer, step 82. The processor may test whether there is another IP datagram left to be extracted from the payload based on information in the bundle map, test 104, and if there is, use the map information to extract the next IP datagram, repeating steps 102 and 82. Once all of the IP datagrams bundled within the received frame payload have been extracted and passed to the IP protocol layer (i.e., test 104="No"), the processor may requests the next frame from the link layer, step 88, and repeat the process by returning to step 70.

The processes for receiving and parsing IP datagrams bundled within variable length frames described above with reference to FIGS. 6 and 8 enable bundled IP datagrams to be separated and passed to the IP protocol layer as if the IP datagrams had not been bundled. Thus, the processes of the various embodiments enable bundling of IP datagrams within variable length frames without requiring modifications to either the link layer or the IP protocol layer.

Figure 9:
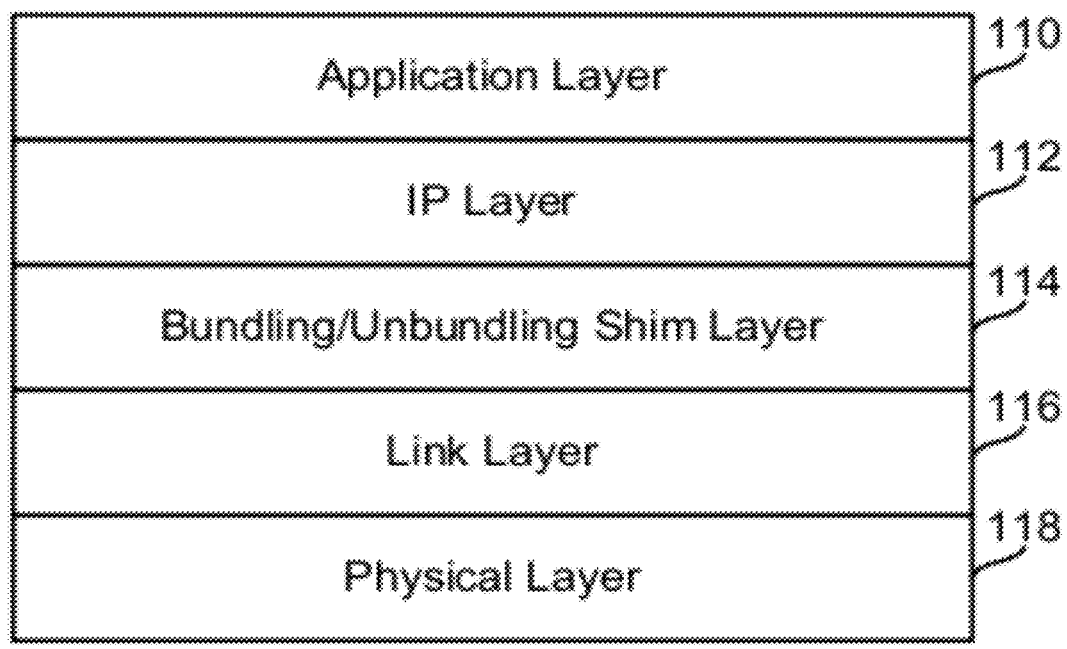
FIG. 9 is a hardware/software architecture diagram illustrating an embodiment implementation.

A hardware/software architecture diagram illustrating how the various embodiments can be implemented within a computer is shown in FIG. 9. The processes of the various embodiments may be implemented within a bundling/unbundling shim layer 114 which is included within the software architecture in between the IP layer 112 and the link layer 116. In this example architecture, the bundling/unbundling shim layer 114 receives IP packets to be transmitted from the IP layer 112, such as by accessing a transmission queue maintained by the IP layer 112, and passes them to the link layer for transmission 116. Similarly, communication frame payloads received from the link layer 116 are processed by the bundling/unbundling shim layer 114, with extracted IP datagrams passed to the IP layer 112. As with traditional hardware/software architectures, the link layer 116 includes the software which interfaces with the physical communication layer 118 which actually transmits information as encoded signals (either RF or electrical pulses). Also, the IP layer 112 passes information extracted from IP datagrams to an application, such as a browser, which is typically referred to as residing within an application layer 110.

While FIG. 9 illustrates an embodiment in which the processing of the various embodiments is performed in a shim layer 112 between the link layer 110 and IP layer 114 in a typical hardware/software architecture, the processing may alternatively be included within the software processing included within either the link layer 110 or the IP layer 114. If the embodiment methods are performed in either of the IP layer 114 or the link layer 110, the hardware/software architecture of such a computer would be similar to that of a conventional system without the shim layer 112 shown in FIG. 9.

If the IP datagram bundling and unbundling processing is included within the link layer 110, the embodiment steps involved in bundling IP datagrams into the frame data payload may be accomplished as part of the processes which assemble each frame prior to transmission. For the case of transmission, the link layer 110 would perform the steps of the embodiment methods described above with reference to FIGS. 4, 5 and 7 with the exception of passing the data payload to the link layer, steps 58, 96, which are unnecessary in this embodiment. For the case of reception, the link layer 110 would perform the steps of the embodiment methods described above with reference to FIGS. 6 and 8 with the exception of receiving the frame payload from the link layer, step 70, which is unnecessary in this embodiment.

If the IP datagram bundling and unbundling processing is included within the IP layer 114, the embodiment steps involved in bundling IP datagrams into the frame data payload may be accomplished as part of the processes which assemble IP datagrams for transmission before being passed to the link layer for transmission. For the case of transmission, the IP layer 114 would perform the steps of the embodiment methods described above with reference to FIGS. 4, 5 and 7 with the exception that the IP layer 114 could determine the length of IP datagrams as the datagrams are assembled rather than by inspecting a transmission queue (step 42). Also, bundle headers could be generated, step 50, as part of the process of assembling IP datagrams. For the case of reception, the IP layer 114 would perform the steps of the embodiment methods described above with reference to FIGS. 6 and 8 with the exception of passing extracted IP datagrams to the IP layer, step 82, which is unnecessary in this embodiment.

The embodiments described above may be implemented on any of a variety of portable computing devices, such as, for example, cellular telephones, personal data assistants (PDA) with cellular telephone and/or WIFI transceivers, mobile electronic mail receivers, mobile web access devices, and other processor-equipped devices that may be developed in the future that connect to one or more data communication links. Typically, such portable computing devices will have in common the components illustrated in FIG. 10. For example, the portable computing devices 120 may include a processor 121 coupled to internal memory 122 and a display 123. Additionally, the portable computing device 120 will have an antenna 124 for sending and receiving electromagnetic radiation that is connected to a wireless data link and/or cellular telephone transceiver 125 coupled to the processor 121. In some implementations, the transceiver 125 and portions of the processor 121 and memory 122 used for cellular telephone communications is referred to as the air interface since it provides a data interface via a wireless data link. Portable computing devices 120 also typically include a key pad 126 or miniature keyboard and menu selection buttons or rocker switches 127 for receiving user inputs. The processor 121 may further be connected to a wired network interface 128, such as a universal serial bus (USB) or FireWire® connector socket, for connecting the processor 121 to an external computing device such as a personal computer 160 or external local area network.

The processor 121 may be any programmable microprocessor, microcomputer or multiple processor chip or chips that can be configured by software instructions (applications) to perform a variety of functions, including the functions of the various embodiments described above. In some portable computing device 120, multiple processors 121 may be provided, such as one processor dedicated to wireless communication functions and one processor dedicated to running other applications. Typically, software applications may be stored in the internal memory 122 before they are accessed and loaded into the processor 121. In some portable computing device 120, the processor 121 may include internal memory sufficient to store the application software instructions. For the purposes of this description, the term memory refers to all memory accessible by the processor 121, including internal memory 122 and memory within the processor 121 itself. Application data files are typically stored in the memory 122. In many portable computing device 120, the memory 122 may be a volatile or nonvolatile memory, such as flash memory, or a mixture of both.

Figure 11:
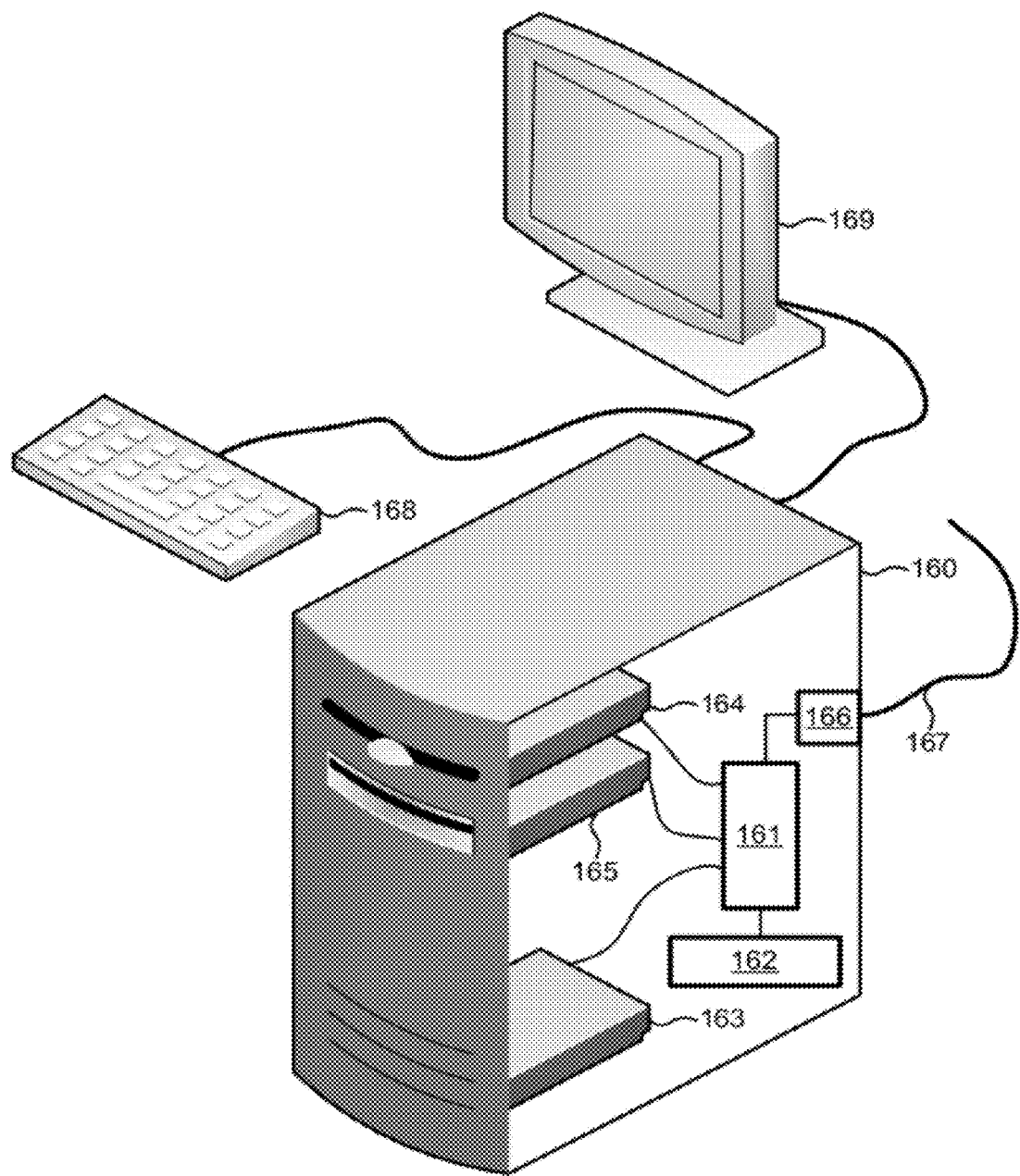
FIG. 11 is a component block diagram of a computer suitable for implementing the various embodiments.

The embodiments described above may also be implemented on any of a variety of computing devices, such as, for example a server or personal computer 160 illustrated in FIG. 11. Such a personal computer 160 typically includes a processor 161 coupled to volatile memory 162 and a large capacity nonvolatile memory, such as a disk drive 163. The computer 13 may also include a floppy disc drive 164 and a compact disc (CD) drive 165 coupled to the processor 161. Typically the computer device 13 will also include a user input device like a keyboard 168 and a display 166. The computer device 13 may also include a number of connector ports coupled to the processor 161 for establishing data connections or receiving external memory devices, such as a USB or FireWire® connector sockets or other network connection circuits 166 for coupling the processor 161 to a network 167. In a laptop configuration, the computer housing includes the keyboard 168 and the display 169 as is well known in the computer arts.

The various embodiments may be implemented by a computer processor 161 executing software instructions configured to implement one or more of the described methods. Such software instructions may be stored in memory 162, 163 as separate applications, or as compiled software implementing an embodiment method. Reference database may be stored within internal memory 162, in hard disc memory 164, on tangible storage medium or on servers accessible via a network (not shown). Further, the software instructions and databases may be stored on any form of tangible processor-readable memory, including: a random access memory 162, hard disc memory 163, a floppy disc (readable in a floppy disc drive 164), a compact disc (readable in a CD drive 165), electrically erasable/programmable read only memory (EEPROM), read only memory (such as FLASH memory), and/or a memory module (not shown) plugged into the computer 160, such as an external memory chip or a USB-connectable external memory (e.g., a "flash drive") plugged into a USB network port 166.

Figure 12:
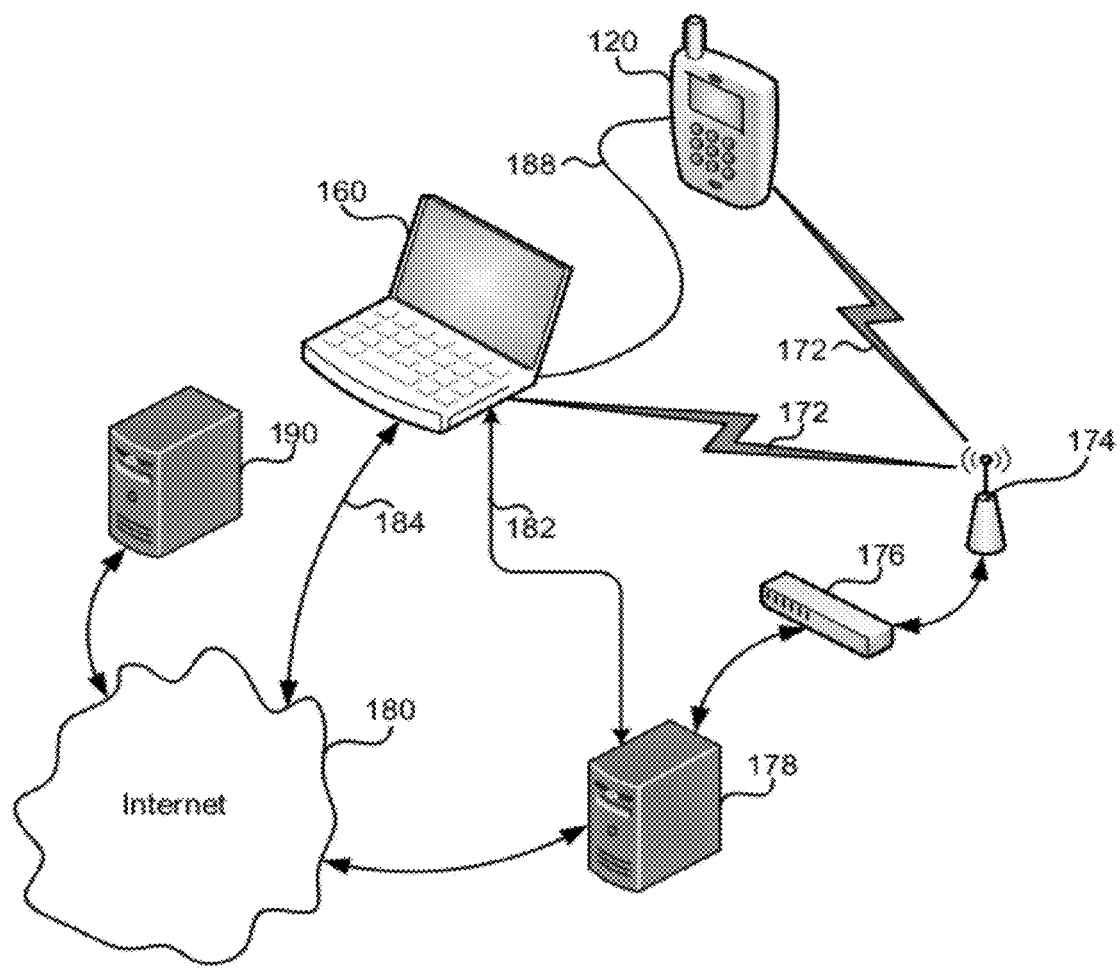
FIG. 12 is a communication system diagram illustrating a communication network suitable for implementing the various embodiments.

Computing devices, such as a mobile device 120 and computer 160 may communicate with each other and other computers and servers 190 via a variety of data networks implementing the various embodiments, an example of which is illustrated in FIG. 12. A mobile device 120 may communicate with data networks via a wireless communication link 172, such as a cellular data call, to a base station antenna 174 coupled for network switching and routing equipment 176. Such network switching and routing equipment 176 may be connected to a network server 178 coupled to the Internet 180. A personal computer 160, such as a laptop computer, may similarly communicate with the wireless network via a wireless communication link 172. Alternatively or additionally, the personal computer 160 may connect directly to a local area network 182 coupled to a network server 178, and through that to the Internet 180. Alternatively or additionally, the personal computer 160 may connect directly to the Internet 180 via a direct connection 184. With a connection to the Internet established by wireless (172) or wired (182, 184) communication links, the mobile device 120 and/or the computer 160 can communicate with other computers and servers 190 via the Internet 180. Additionally, a mobile device 120 may be connected to a computer 160 by a wired network connection 188, such as a FireWire or USB network connection.

Each of the communication links illustrated in FIG. 12 may be configured as a high speed communication link that may implement variable size frames. However, due to link protocol limitations (e.g., the Internet protocol implemented on the Internet 180) or physical limitations (e.g., interference or noise on wireless communication links 172) the various communication links may implement different frame sizes. Thus, the foregoing embodiments may be implemented on any of the different communication links 172, 182, 184, 188 available to computing devices 120, 160, 178, 190 in order to optimize data communications.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the steps of a method described above and shown in the figures is for example purposes only as the order of some steps may be changed from that described herein without departing from the spirit and scope of the present invention and the claims. The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for transmitting Internet Protocol (IP) datagrams over a communication link having variable frame sizes, comprising:
    determining a number of the IP datagrams that can fit within a frame payload for a current frame size;
    generating a respective bundle header for each IP datagram that fits within the current frame size;
    joining the respective bundle header to each corresponding IP datagram to form a data payload comprising a plurality of IP datagrams interspersed with respective bundle headers; and
    communicating the data payload as the frame payload without indicating in a frame header of that the frame includes bundled IP datagrams;
    wherein the step of determining the number of the IP datagrams that can fit within the frame payload comprises:
    determining the current frame size of the communication link;
    determining sizes of the IP datagrams in a queue for transmission; and
    determining how many of the IP datagrams in the queue along with bundle headers can be fit within the current frame size.

2. The method of claim 1, wherein information indicating that each respective bundle header is associated with each corresponding IP datagram comprises a most significant bit in the bundle header having a value of 1.

3. The method of claim 1, wherein information indicating that each respective bundle header is associated with each corresponding IP datagram comprises a first nibble in the bundle header having a value that is not 4 or 6.

4. A computer, comprising:
    a processor; and
    a memory coupled to the processor,
    wherein the processor is configured with software instructions to perform steps comprising:
        determining a number of IP datagrams that can fit within a frame payload for a current frame size;
        generating a respective bundle header for each IP datagram that fits within the current frame size;
        joining the respective bundle header to each corresponding IP datagram to form a data payload comprising a plurality of IP datagrams interspersed with respective bundle headers; and
        communicating the data payload as the frame payload without indicating in a frame header of that the frame includes bundled IP datagrams;
    wherein the processor is configured with the software instructions such that the step of determining the number of the IP datagrams that can fit within the frame payload comprises:
        determining the current frame size;
        determining sizes of the IP datagrams in a queue for transmission; and
        determining how many of the IP datagrams in the queue along with the bundle header can be fit within the current frame size.

5. The computer of claim 4, wherein the processor is configured with the software instructions such that information indicating that each respective bundle header is associated with each corresponding IP datagram comprises a most significant bit in the bundle header having a value of 1.

6. The computer of claim 4, wherein the processor is configured with the software instructions such that information indicating that each respective bundle header is associated with each corresponding IP datagram comprises a first nibble in the bundle header having a value that is not 4 or 6.

7. A computer, comprising:
    means for determining a number of IP datagrams that can fit within a frame payload for a current frame size;
    means for generating a respective bundle header for each IP datagram that fits within the current frame size;
    means for joining the respective bundle header to each corresponding IP datagram to form the data payload comprising a plurality of IP datagrams interspersed with respective bundle headers; and
    means for communicating the data payload as the frame payload without indicating in a frame header of that the frame includes bundled IP datagrams;
    wherein the means for determining the number of the IP datagrams that can fit within the frame payload comprises:
    means for determining the current frame size;
    means for determining sizes of the IP datagrams in a queue for transmission; and
    means for determining how many of the IP datagrams in the queue along with the bundle header can be fit within the current frame size.

8. The computer of claim 7, wherein information indicating that each respective bundle header is associated with each corresponding IP datagram comprises a most significant bit in the bundle header having a value of 1.

9. The computer of claim 7, wherein information indicating that each respective bundle header is associated with each corresponding IP datagram comprises a first nibble in the bundle header that has a value that is not 4 or 6.

10. A non-transitory storage medium having stored thereon processor-executable software instructions configured to cause a processor of a computer to perform steps comprising:
    determining a number of IP datagrams that can fit within a frame payload for a current frame size;
    generating a respective bundle header for each IP datagram that fits within the current frame size;
    joining the respective bundle header to each corresponding IP datagram to form a data payload comprising a plurality of IP datagrams interspersed with respective bundle headers; and
    communicating the data payload as the frame payload without indicating in a frame header of that the frame includes bundled IP datagrams;
    wherein the non-transitory storage medium has stored thereon the processor-executable software instructions configured to cause the processor of a computer to perform steps such that the step of determining the number of the IP datagrams that can fit within the frame payload comprises:

determining the current frame size of a communication link;

determining sizes of the IP datagrams in a queue for transmission; and determining how many of the IP datagrams in the queue along with the bundle header can be fit within the current frame size.

11. The non-transitory storage medium of claim 10, wherein the non-transitory storage medium has stored thereon the processor-executable software instructions configured to cause the processor of a computer to perform steps such information indicating that each respective bundle header is associated with each corresponding IP datagram comprises a most significant bit in the bundle header having a value of 1.

12. The non-transitory storage medium of claim 10, wherein the non-transitory storage medium has stored thereon the processor-executable software instructions configured to cause the processor of a computer to perform steps such information indicating that each respective bundle header is associated with each corresponding IP datagram comprises a first nibble in the bundle header having a value that is not 4 or 6.

13. A method for transmitting Internet Protocol (IP) datagrams over a communication link having variable frame sizes, comprising:

determining a number of the IP datagrams that can fit within a frame payload for a current frame size;

generating a bundle header including a map identifying a location of each IP datagram bundled within the frame payload;

joining the bundle header at least one of the bundled IP datagrams to form a data payload comprises concatenating the bundle header and all of the IP datagrams in a queue for transmission that can be fit within the current frame size; and communicating the data payload as the frame payload without indicating in a frame header of that a frame includes bundled IP datagrams;

wherein the step of determining the number of the IP datagrams that can fit within the frame payload comprises:

determining the current frame size of the communication link;

determining sizes of the IP datagrams in a queue for transmission; and determining how many of the IP datagrams in the queue along with bundle headers can be fit within the current frame size.

14. The method of claim 13, wherein the information indicating that the bundle header is associated with a bundled IP datagram comprises a most significant bit in the bundle header having a value of 1.

15. The method of claim 13, wherein the information indicating that the bundle header is associated with a bundled IP datagram comprises a first nibble in the bundle header having a value that is not 4 or 6.

16. A computer, comprising:
a processor; and
a memory coupled to the processor,
wherein the processor is configured with software instructions to perform steps comprising:
determining a number of IP datagrams that can fit within a frame payload for a current frame size;

generating a bundle header including a map identifying a location of each IP datagram bundled within the frame payload;

joining the bundle header at least one of the bundled IP datagrams to form a data payload comprises concatenating the bundle header and all of the IP datagrams in a queue for transmission that can be fit within the current frame size; and communicating the data payload as the frame payload without indicating in a frame header of that a frame includes bundled IP datagrams;

wherein the processor is configured with the software instructions such that the step of determining the number of the IP datagrams that can fit within the frame payload comprises:

determining the current frame size;

determining sizes of the IP datagrams in a queue for transmission;

and determining how many of the IP datagrams in the queue along with the bundle header can be fit within the current frame size.

17. The computer of claim 16, wherein the processor is configured with the software instructions such that information indicating that the bundle header is associated with a bundled IP datagram comprises a most significant bit in the bundle header having a value of 1.

18. The computer of claim 16, wherein the processor is configured with the software instructions such that information indicating that the bundle header is associated with a bundled IP datagram comprises a first nibble in the bundle header having a value that is not 4 or 6.

19. A computer, comprising:
means for determining a number of IP datagrams that can fit within a frame payload for a current frame size;

means for generating a bundle header including a map identifying a location of each IP datagram bundled within the frame payload;

means for joining the bundle header at least one of the bundled IP datagrams to form a data payload comprises concatenating the bundle header and all of the IP datagrams in a queue for transmission that can be fit within the current frame size; and means for communicating the data payload as the frame payload without indicating in a frame header of that the frame includes bundled IP datagrams;

wherein the means for determining the number of the IP datagrams that can fit within the frame payload comprises:

means for determining the current frame size;

means for determining sizes of the IP datagrams in a queue for transmission; and means for determining how many of the IP datagrams in the queue along with the bundle header can be fit within the current frame size.

20. The computer of claim 19, wherein information indicating that the bundle header is associated with a bundled IP datagram comprises a most significant bit in the bundle header having a value of 1.

21. The computer of claim 19, wherein information indicating that the bundle header is associated with a bundled IP datagram comprises a first nibble in the bundle header that has a value that is not 4 or 6.

22. A non-transitory storage medium having stored thereon processor-executable software instructions configured to cause a processor of a computer to perform steps comprising:
determining a number of IP datagrams that can fit within a frame payload for a current frame size;

generating a bundle header including a map identifying a location of each IP datagram bundled within the frame payload;
joining the bundle header at least one of the bundled IP datagrams to form a data payload comprises concatenating the bundle header and all of the IP datagrams in a queue for transmission that can be fit within the current frame size; and
communicating the data payload as the frame payload without indicating in a frame header of that a frame includes bundled IP datagrams;
wherein the stored processor-executable software instructions are configured to cause the processor of a computer to perform steps such that the step of determining the number of the IP datagrams that can fit within the frame payload comprises:
determining the current frame size of the communication link;
determining sizes of the IP datagrams in a queue for transmission; and
determining how many of the IP datagrams in the queue along with the bundle header can be fit within the current frame size.

23. The non-transitory storage medium of claim 22 wherein the stored processor-executable software instructions are configured to cause the processor of a computer to perform steps such information indicating that the bundle header is associated with a bundled IP datagram comprises a most significant bit in the bundle header having a value of 1.

24. The non-transitory storage medium of claim 22, wherein the stored processor-executable software instructions are configured to cause the processor of a computer to perform steps such information indicating that the bundle header is associated with a bundled IP datagram comprises a first nibble in the bundle header having a value that is not 4 or 6.

* * * * *